(12) United States Patent
Wu

(10) Patent No.: US 8,901,257 B2
(45) Date of Patent: Dec. 2, 2014

(54) ENDLESS FLEXIBLE MEMBERS FOR IMAGING DEVICES

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 752 days.

(21) Appl. No.: 13/026,249

(22) Filed: Feb. 12, 2011

(65) Prior Publication Data

US 2012/0208906 A1  Aug. 16, 2012

(51) Int. Cl.
*C08G 75/20* (2006.01)
*C08G 75/23* (2006.01)
*C08G 73/10* (2006.01)
*C08G 73/12* (2006.01)
*G03G 15/16* (2006.01)
*B28B 7/30* (2006.01)
*C08J 5/20* (2006.01)

(52) U.S. Cl.
CPC .............. *G03G 15/162* (2013.01); *B28B 7/30* (2013.01); *C08J 5/20* (2013.01)

USPC ........... 525/537; 524/495; 524/496; 525/417; 525/419; 525/450

(58) Field of Classification Search
USPC ........... 524/495, 496; 525/417, 537, 419, 450
See application file for complete search history.

(56) References Cited

U.S. PATENT DOCUMENTS

| 4,747,992 A | * | 5/1988 | Sypula et al. ................ 264/130 |
| 8,017,699 B1 | * | 9/2011 | Sanner et al. ................ 525/422 |
| 2009/0018265 A1 | * | 1/2009 | Kailasam et al. ............ 524/609 |
| 2012/0070769 A1 | * | 3/2012 | Qi et al. ........................ 430/104 |

FOREIGN PATENT DOCUMENTS

WO  WO 2008116939 A2 * 10/2008

* cited by examiner

*Primary Examiner* — Ling Choi
*Assistant Examiner* — David L Miller
(74) *Attorney, Agent, or Firm* — MDIP LLC

(57) ABSTRACT

Flexible members for use in imaging devices comprise a polyphenylsulfone and a polyetherimide; and optionally, a polysiloxane surfactant.

8 Claims, No Drawings

ENDLESS FLEXIBLE MEMBERS FOR IMAGING DEVICES

FIELD

A novel flexible member composition, such as, an intermediate transfer belt (ITB), such as, an endless belt having an annular main body, for use in an electrophotographic imaging device is provided. The imaging device produces a fixed toner image on a recording medium.

BACKGROUND

In the electrophotographic imaging arts, an image forming apparatus forms a static latent image by exposure of a surface of a charged photosensitive member to patterns of light, develops that static latent image to form a toner image, and finally transfers the toner image to a recording or receiving medium, such as, a paper, at a predetermined transfer position, thereby forming an image thereon.

One such image forming apparatus employs, in the process of image formation and development, an endless belt that is stretched around support rolls, and which circulates and moves as a unit, carrying the formed toner image to a transfer position. Alternatively, the endless belt can operate as a unit that transfers the recording medium to a transfer position.

In an image forming apparatus that forms a color image, because toner images of individual different colors are superimposed on one another, an endless belt can be used as a unit that carries the toner images of different color which are sequentially applied or received in building the final composite color image. An endless belt also can be used as a unit for transferring a recording medium that sequentially receives toner images of different color. See, for example, U.S. Pat. No. 7,677,848 and U.S. Publ. No. 20100279217, herein incorporated by reference in entirety.

Image forming apparatus with high endurance that are capable of withstanding, for example, temperature variation and high volume output, are desirable. Hence, materials to enhance flexible member performance and preparation are desirable.

Endless flexible belts can be made by producing a film on or attached to a mold, mandrel or form. A film-forming solution or composition is applied to a form by, for example, dipping, spraying, flow coating or other known method, and the solution or composition can be dispersed or distributed to form a thin film, for example, by centrifugation over the inner wall of a hollow form, for example, a cylindrical form.

SUMMARY

According to aspects disclosed herein, there is provided a film-forming composition for making flexible members for use in electrophotography, such as, a flexible image transfer member, such as, an intermediate transfer belt (ITB), wherein a coating solution for forming same comprises a polyphenylsulfone and a polyetherimide.

An embodiment comprises a film-forming composition, such as, a coating solution for making a flexible image transfer member, such as, an intermediate transfer belt (ITB), optionally comprising a polysiloxane surfactant.

Another disclosed embodiment comprises an imaging or printing device comprising a film comprising a polyphenylsulfone and a polyetherimide, and optionally, a polysiloxane surfactant.

DETAILED DESCRIPTION

As used herein, the term, "electrophotographic," or grammatic versions thereof, is used interchangeably with the term, "xerographic." In some embodiments, such as, in the case of forming a color image, often, individual colors of an image are applied sequentially. Thus, a, "partial image," is one which is composed of one or more colors prior to application of the last of the colors to yield the final or composite color image. "Flexible," is meant to indicate ready deformability, such as, observed in a belt, web, film and the like, that, for example, are adaptable to operate and for use with, for example, rollers.

For the purposes of the instant application, "about," is meant to indicate a deviation of no more than 20% of a stated value or a mean value. Other equivalent terms include, "substantial," and, "essential," or grammatic forms thereof.

In electrophotographic (xerographic) reproducing or imaging devices, including, for example, a digital copier, an image-on-image copier, a contact electrostatic printing device, a bookmarking device, a facsimile device, a printer, a multifunction device, a scanning device and any other such device, a printed output is provided, whether black and white or color, or a light image of an original is recorded in the form of an electrostatic latent image on an imaging device component, for example, which may be present as an integral component of an imaging device or as a replaceable component or module of an imaging device, and that latent image is rendered visible using electroscopic, finely divided, colored or pigmented particles, or toner. The imaging device component can be a flexible member.

A flexible member can comprise an intermediate transfer member, such as, an intermediate transfer belt (ITB), a fuser belt, a pressure belt, a transfuse belt, a transport belt, a developer belt and the like. Such members can comprise a single layer or plural layers, such as, a support layer and one or more layers of particular function.

Hence, such transfer members can be present in an electrophotographic image forming device or printing device. In the case of an ITB, a photoreceptor is electrostatically charged and then is exposed to a pattern of activating electromagnetic radiation, such as, light, which alters the charge on the surface of an imaging device component leaving behind an electrostatic latent image thereon. The electrostatic latent image then is developed at one or more developing stations to form a visible image or a partial image, by depositing finely divided electroscopic colored, dyed or pigmented particles, or toner, for example, from a developer composition, on the surface of the imaging component. The resulting visible image on the photoreceptor is transferred to an ITB for transfer to a receiving member or for further developing of the image, such as, building additional colors on successive partial images. The final image then is transferred to a receiving member, such as, a paper, a cloth, a polymer, a plastic, a metal and so on, which can be presented in any of a variety of forms, such as, a flat surface, a sheet or a curved surface. The transferred particles are fixed or fused to the receiving member by any of a variety of means, such as, by exposure to elevated temperature and/or elevated pressure.

An intermediate transfer member also finds use in color systems and other multi-imaging systems. In a multi-imaging system, more than one image is developed, that is, a series of partial images. Each image is formed on the photoreceptor, is developed at individual stations and is transferred to an intermediate transfer member. Each of the images may be formed on the photoreceptor, developed sequentially and then transferred to the intermediate transfer member or each image may be formed on the photoreceptor developed and transferred in register to the intermediate transfer member. See for example, U.S. Pat. Nos. 5,409,557; 5,119,140; and 5,099,286, the contents of which are incorporated herein by reference in entirety.

It can be desirable to minimize transferring developer or developer carrier to the receiving member, that is, for example, a paper. Therefore, it can be advantageous to transfer the developed image on a photoreceptor to an intermediate transfer web, belt, roll or member, and subsequently to transfer the developed image from the intermediate transfer member to a permanent or ultimate substrate.

To obtain quality image transfer, that is, to minimize image shear, the displacement of a transfer member due to disturbance during transfer member driving can be reduced by limiting the thickness of the support or substrate, for example to about 50 μm. Thus, the thickness of the substrate or support can be from about 50 μm to about 150 μm or from 70 μm to about 100 μm.

In the instant disclosure, a substrate, film, member or layer of interest comprises a polyphenylsulfone and a polyetherimide suitable for use in a flexible member in an imaging device.

Suitable polyphenylsulfones are those with a $T_g$ or about 220° C. Also, one which is soluble in solvents suitable for use for rapid application and preparation of molded members for use in the imaging arts, such as, dip coating, flow coating, spray coating and so on, such as, N-methyl-pyrrolidone, dimethylformamide, tetrahydrofuran, dimethylacetamide, sulfolane and so on, will find use in the practice of the instant disclosure. Examples of commercially available such polyphenylsulfones are RADEL® polymers (Solvay Plastics), such as R-5000, R-5100, R-5500, R-5800 and R-5900, and so on. The polyphenylsulfone is present in the film-forming composition, on a weight basis, in an amount from about 50 wt % to about 85 wt %, from about 60 wt % to about 80 wt % or from about 70 wt % to about 75 wt %.

A suitable polyetherimide is one which has ready miscibility with the polyphenylsulfone, the solvent and other reagents. Thus, a polyetherimide comprising a functional group, such as, a sulfonyl group, can find use in a film of interest. Examples of commercially available polyetherimides are an EXTEM® resin (Sabic), such as, XH1005 and XH1015, or an ULTEM® resin (Boedeker Plastics), such as 1000. The polyetherimide is present in the film-forming composition, on a weight basis, in an amount from about 5 wt % to about 30 wt %, from about 7.5 wt % to about 25 wt % or from about 10 wt % to about 20 wt %.

The film-forming composition comprising a polyphenylsulfone and a polyetherimide optionally can comprise a polysiloxane surfactant to enhance surface uniformity, smoothness and so on. Suitable examples include polyether and/or polyester modified polydimethylsiloxanes, which can be hydroxylated, or silicone modified polyacrylates. Examples of commercially available silicone surfactants include a BYK® additive, such as, 310, 330, 333, 344, 370 and 375, and BYK®-SILCLEAN 3700, 3710 and 3720.

The polysiloxane surfactant can be present in the film-forming composition in an amount of from about 0.01 wt % to about 0.1 wt %, from about 0.03 wt % to about 0.07 wt %, from about 0.04 wt % to about 0.06 wt %, or about 0.05 wt % on a weight basis.

A transfer member or device generally is one where the surface destined to carry an image has a low surface energy, i.e., material comprising an electrically conducting agent dispersed thereon having a contact angle of not less than about 70° or at least about 70° with respect to a water droplet as represented by wettability by water. The term, "wettability by water," as used herein is meant to indicate the angle of contact of a material constituting the surface layer as a specimen with respect to a water droplet.

Electrical property regulating materials can be added to the substrate or to a layer superficial thereto to regulate electrical properties, such as, surface and bulk resistivity, dielectric constant and charge dissipation. In general, electrical property regulating materials can be selected based on the desired resistivity of the film. High volume fractions or loadings of the electrical property regulating materials can be used so that the number of conductive pathways is always well above the percolation threshold, thereby avoiding extreme variations in resistivity. The percolation threshold of a composition is a volume concentration of dispersed phase below which there is so little particle to particle contact that the connected regions are small. At higher concentrations than the percolation threshold, the connected regions are large enough to traverse the volume of the film, see, for example, Scher et al., J Chem Phys, 53(9)3759-3761, 1970, who discuss the effects of density in percolation processes.

Particle shape of the electrical property regulating material can influence volume loading. Volume loading can depend on whether the particles are, for example, spherical, round, irregular, spheroidal, spongy, angular or in the form of flakes or leaves. Particles having a high aspect ratio do not require as high a loading as particles having a relatively lower aspect ratio. Particles which have relatively high aspect ratios include flakes and leaves. Particles which have a relatively lower aspect ratio are spherical and round particles.

The percolation threshold is practically within a range of a few volume % depending on the aspect ratio of the loadent. For any particular particle resistivity, the resistivity of the coated film can be varied over about one order of magnitude by changing the volume fraction of the resistive particles in the layer. The variation in volume loading enables fine tuning of resistivity.

The resistivity varies approximately linearly to the bulk resistivity of the individual particles and the volume fraction of the particles in the support or layer. The two parameters can be selected independently. For any particular particle resistivity, the resistivity of the reinforcing member can be varied over roughly an order of magnitude by changing the volume fraction of the particles. The bulk resistivity of the particles is preferably chosen to be up to three orders of magnitude lower than the bulk resistivity desired in the member. When the particles are mixed with the support or layer in an amount above the percolation threshold, the resistivity of the resulting reinforcing member can decrease in a manner proportional to the increased loading. Fine tuning of the final resistivity may be controlled on the basis of that proportional increase in resistivity.

The bulk resistivity of a material is an intrinsic property of the material and can be determined from a sample of uniform cross section. The bulk resistivity is the resistance of such a sample multiplied by the cross sectional area divided by the length of the sample. The bulk resistivity can vary somewhat with the applied voltage.

The surface or sheet resistivity (expressed as ohms/square, Ω/□) is not an intrinsic property of a material because that metric depends on material thickness and contamination of the material surface, for example, with condensed moisture. When surface effects are negligible and bulk resistivity is isotropic, the surface resistivity is the bulk resistivity divided by the reinforcing member thickness. The surface resistivity of a film can be measured without knowing the film thickness by measuring the resistance between two parallel contacts placed on the film surface. When measuring surface resistivity using parallel contacts, one uses contact lengths several times longer than the contact gap so that end effects do not cause significant error. The surface resistivity is the measured resistance multiplied by the contact length to gap ratio.

Particles can be chosen which have a bulk resistivity slightly lower than the desired bulk resistivity of the resulting member. The electrical property regulating materials include, but are not limited to pigments, quaternary ammonium salts, carbons, dyes, conductive polymers and the like.

A carbon black particle of interest is one with a particle diameter of from about 10 nm to about 30 nm, from about 12 nm to about 25 nm or from about 15 nm to about 20 nm. A carbon black of interest is one with a BET surface area of from about 100 m$^2$/g to about 600 m$^2$/g, from about 200 m$^2$/g to about 500 m$^2$/g or from about 300 m$^2$/g to about 400 m$^2$/g. A carbon black of interest is one with a DBA absorption value of about 1 ml/g to about 7 ml/g, from about 1.5 ml/g to about 6 ml/g or from about 2 ml/g to about 5 ml/g. An example of a commercially available carbon black is Special Black 4, Special Black 5, Color Black FW1, Color Black FW2 or Color Black FW200 (Evonik Industries).

Electrical property regulating materials, such as, a carbon black, may be added in amounts ranging from about 1% by weight to about 25% by weight of the total weight of the support or layer, from about 7% by weight to about 20% by weight, or from about 10% to about 15% by weight of the total weight of the support or layer.

Also, carbon black systems can be used to make a layer or layers conductive. That can be accomplished by using more than one variety of carbon black, that is, carbon blacks with different, for example, particle geometry, resistivity, chemistry, surface area and/or size. Also, one variety of carbon black or more than one variety of carbon black can be used along with other non-carbon black conductive fillers.

An example of using more than one variety of carbon black, each having at least one different characteristic from the other carbon black, includes mixing a structured black, such as, VULCAN® XC72, having a steep resistivity slope, with a low structure carbon black, such as, REGAL 250R®, having lower resistivity at increased filler loadings. The desired state is a combination of the two varieties of carbon black which yields a balanced controlled conductivity at relatively low levels of filler loading, which can improve mechanical properties.

Another example of mixing carbon blacks comprises a carbon black or graphite having a particle shape of a sphere, flake, platelet, fiber, whisker or rectangle used in combination with a carbon black or graphite with a different particle shape, to obtain good filler packing and thus, good conductivity. For example, a carbon black or graphite having a spherical shape can be used with a carbon black or graphite having a platelet shape. The ratio of carbon black or graphite fibers to spheres can be about 3:1.

Similarly, by use of relatively small particle size carbon blacks or graphites with relatively large particle size carbon blacks or graphite, the smaller particles can orient in the packing void areas of the polymer substrate to improve particle contact. As an example, a carbon black having a relatively large particle size of from about 1 µm to about 100 µm or from about 5 µm to about 10 µm can be used with a carbon black having a particle size of from about 0.1 µm to about 1 µm or from about 0.05 µm to about 0.1 µm.

In another embodiment, a mixture of carbon black can comprise a first carbon black having a BET surface area of from about 30 m$^2$/g to about 700 m$^2$/g and a second carbon black having a BET surface area of from about 150 m$^2$/g to about 650 m$^2$/g.

Also, combinations of resistivity can be used to yield a shallow resistivity change with filler loading. For example, a carbon black or other filler having a resistivity of about $10^{-1}$ to about $10^3$ ohms-cm, or about $10^{-1}$ to about $10^2$ ohms-cm used in combination with a carbon black or other filler having a resistivity of from about $10^3$ to about $10^7$ ohms-cm can be used.

Other fillers, in addition to carbon blacks, can be added to the polymer, resin or film-forming composition and dispersed therein. Suitable fillers include metal oxides, such as, magnesium oxide, tin oxide, zinc oxide, aluminum oxide, zirconium oxide, barium oxide, barium titanate, beryllium oxide, thorium oxide, silicon oxide, titanium dioxide and the like; nitrides such as silicon nitride, boron nitride, and the like; carbides such as titanium carbide, tungsten carbide, boron carbide, silicon carbide, and the like; and composite metal oxides such as zircon ($ZrO_2.Al_2O_3$), spinel ($MgO.Al_2O_3$), mullite ($3Al_2O_3.2SiO_2$), sillimanite ($Al_2O_3.SiO_2$), and the like; mica; and combinations thereof. Optional fillers can present in the polymer/mixed carbon black coating in an amount of from about 20% to about 75% by weight of total solids, or from about 40% to about 60% by weight of total solids.

The resistivity of the coating layer can be from about $10^7$ to about $10^{13}$ Ω/□, from about $10^8$ to about $10^{12}$ Ω/□ or from about $10^9$ to about $10^{11}$ Ω/□.

In another embodiment, the layer has a dielectric thickness of from about 1 µm to about 10 µm or from about 4 µm to about 7 µ.

The hardness of the coating can be less than about 85 Shore A, from about 45 Shore A to about 65 Shore A, or from about 50 Shore A to about 60 Shore A.

In another embodiment, the surface can have a water contact angle of at least about 60°, at least about 75°, at least about 90° or at least about 95°.

Transfer members can be prepared using methods known in the art. The polyphenylsulfone and polyetherimide composition is prepared by mixing and dispersing the components in a dispersing machine or a mixing vessel is a suitable solvent, and then is applied to the form, mandrel or mold, such as, one made from a resin, a glass, a ceramic, stainless steel and so on, for example, using rapid methods such as, liquid and dry powder spray coating, flow coating, roll coating, dip-spin coating, dip coating, wire wound rod coating, fluidized bed coating, powder coating, electrostatic spraying, sonic spraying, blade coating and the like. If a coating is applied by spraying, spraying can be assisted mechanically and/or electrically, such as, by electrostatic spraying. See, for example, U.S. Pat. Nos. 4,747,992, 7,593,676 and 4,952,293, which are hereby incorporated herein by reference. Essentially application methods that minimize unique or limiting equipment, are scalable and are rapid are those used for making a flexible member of interest.

The film is allowed to dry and/or to cure at a suitable temperature; and then is removed from the form, mandrel or mold.

The film can be seamless or can be worked to make a seamed member, as known in the art.

Various aspects of the embodiments of interest now will be exemplified in the following non-limiting examples.

EXAMPLES

Example 1

A 75/10/15/0.05 ratio by weight of RADEL® R-5000NT (Solvay), EXTEM® XH-1005 (Sabic), Special Black 4 carbon black (Evonik Industries) and BYK 333 were dissolved in N-methyl-2-pyrrolidone and blended in an attritor. After mixing, the solution was coated on a stainless steel substrate, dried and cured.

Comparative Example 1

An 85/5/0.05 ratio by weight of RADEL® R-5000NT (Solvay), Special Black 4 carbon black (Evotik Industries) and BYK 333 were dissolved in N-methyl-2-pyrrolidone and blended in an attritor. After mixing, the solution was coated on a stainless steel substrate with a 10-mil Bird bar, and dried and cured.

|  | ITB of Comparative Example | ITB of Example |
|---|---|---|
| Surface resistivity (ohm/□) | $1.8 \times 10^9$ | $2.0 \times 10^9$ |
| Young's modulus (MPa) | 3,600 | 4,000 |
| CTE (ppm) | 100 | 72 |
| Tear resistance (MPa) | 82 | 118 |

Example 2

The ITB's of Example 1 and Comparative Example 1 were tested for various properties using materials and methods known in the art. The results are provided in the table above.

The two films had comparable values of surface resistivity. However, the tear resistance of the ITB containing polyetherimide is improved by over 40% over that of the ITB containing polyphenylsulfone alone. Moreover, the Young's modulus of the ITB containing polyetherimide is improved by over 10% over that of the ITB containing polyphenylsulfone alone; and the CTE of the ITB containing polyetherimide is reduced by over 25% over that of the ITB containing polyphenylsulfone alone.

All references cited herein are herein incorporated by reference in entirety.

It will be appreciated that variants of the above-disclosed and other features and functions, or alternatives thereof, may be combined with other and different systems or applications. Various presently unforeseen or unanticipated alternatives, changes, modifications, variations or improvements subsequently may be made by those skilled in the art to and based on the teachings herein without departing from the spirit and scope of the embodiments, and which are intended to be encompassed by the following claims.

I claim:

1. A flexible intermediate transfer member comprising a polyphenylsulfone, a polyetherimide comprising a sulfonyl group and a polysilxoane surfactant, wherein said polyetherimide is present in an amount by weight of from about 5 wt % to about 30 wt % and wherein said surfactant is present in an amount from about 0.01% by weight to about 0.1% by weight.

2. The flexible intermediate transfer member of claim 1, further comprising an electrical property regulating material.

3. The flexible intermediate transfer member of claim 1, wherein said polyphenylsulfone is present in an amount by weight of from about 50 wt to about 85 wt %.

4. The flexible intermediate transfer member of claim 2, wherein said electrical property regulating material comprises a carbon black.

5. The flexible intermediate transfer member of claim 2, wherein said electrical property regulating material is present in an amount by weight of from about 15 wt % to about 25 wt.

6. The flexible intermediate transfer member of claim 1, wherein said polyetherimide is present in an amount by weight of about 10% wt.

7. An imaging device comprising the intermediate transfer member of claim 1.

8. A method for making a flexible intermediate transfer member comprising dip coating, spray coating or flow coating a composition comprising a polyphenylsulfone, a polyetherimide comprising a sulfonyl group, and a polysilxoane surfactant on or to a mold, wherein said polyetherimide is present in an amount by weight of from about 5 wt % to about 30 wt % and wherein said surfactant is present in an amount from about 0.01% by weight to about 0.1% by weight; drying and/or curing said composition; and removing said flexible intermediate transfer member from said mold.

* * * * *